US008641070B2

(12) United States Patent
Birmanns et al.

(10) Patent No.: US 8,641,070 B2
(45) Date of Patent: Feb. 4, 2014

(54) DRIVE ASSISTANCE DEVICE, WHEELCHAIR AND METHOD FOR DETERMINATION OF THE PHYSICAL EFFICIENCY AND MUSCULAR EFFORT DATA OF A WHEELCHAIR DRIVER

(75) Inventors: Thomas Birmanns, Balingen (DE); Ralf Ledda, Albstadt (DE); Bernd Engels, Reutlingen (DE); Paul-Gerhard Bitzer, Albstadt (DE)

(73) Assignee: Ulrich Alber GmbH, Albstadt (DE)

( * ) Notice: Subject to any disclaimer, the term of this patent is extended or adjusted under 35 U.S.C. 154(b) by 192 days.

(21) Appl. No.: 13/226,692

(22) Filed: Sep. 7, 2011

(65) Prior Publication Data

US 2012/0068435 A1 Mar. 22, 2012

(30) Foreign Application Priority Data

Sep. 22, 2010 (DE) ......................... 10 2010 037 710

(51) Int. Cl.
*A61G 5/00* (2006.01)
*B62M 1/14* (2006.01)

(52) U.S. Cl.
USPC ..................................... 280/250.1; 280/304.1

(58) Field of Classification Search
USPC ............................. 180/907; 280/250.1, 304.1
See application file for complete search history.

(56) References Cited

U.S. PATENT DOCUMENTS

| | | | | |
|---|---|---|---|---|
| 5,240,417 | A * | 8/1993 | Smithson et al. | 434/61 |
| 5,364,271 | A * | 11/1994 | Aknin et al. | 434/61 |
| 5,366,037 | A * | 11/1994 | Richey | 180/65.51 |
| 6,174,269 | B1 * | 1/2001 | Eschenbach | 482/132 |
| 2002/0019686 | A1 * | 2/2002 | Ulrich et al. | 701/1 |
| 2007/0284845 | A1 * | 12/2007 | Roovers et al. | 280/250.1 |
| 2009/0133517 | A1 * | 5/2009 | Kamara et al. | 74/10.29 |

FOREIGN PATENT DOCUMENTS

| | | |
|---|---|---|
| DE | 19857786 | 9/1999 |
| EP | 0945113 | 9/1999 |

* cited by examiner

*Primary Examiner* — Kevin Hurley
*Assistant Examiner* — Marc A Scharich
(74) *Attorney, Agent, or Firm* — RatnerPrestia

(57) ABSTRACT

A drive assistance device for a wheelchair includes a drive motor, a running wheel and a sensor device which is adapted to determine a driving force manually induced into the running wheel; and a control unit which is adapted to control the drive motor for driving the running wheel depending on the driving force manually induced by the user into the running wheel. The control unit of the drive assistance device includes a user force analysis operational mode which is adapted to determine data concerning physical efficiency and capacity of the user. These include a maximum force of the user as well as the maximum speed which can be reached with purely manual drive.

22 Claims, 2 Drawing Sheets

DRIVE ASSISTANCE DEVICE, WHEELCHAIR AND METHOD FOR DETERMINATION OF THE PHYSICAL EFFICIENCY AND MUSCULAR EFFORT DATA OF A WHEELCHAIR DRIVER

FIELD OF THE INVENTION

The invention relates to a drive assistance device for a wheelchair, a wheelchair having a drive assistance device and a method for determination of the physical efficiency and muscular effort data of a wheelchair driver.

BACKGROUND

A drive assistance device of the before-mentioned kind is known from DE 198 57 786 A1, which is incorporated by reference herein in its entirety. Such a drive assistance device for a wheelchair comprises a drive motor, a running wheel, a sensor device, which is adapted to sense a driving force manually applied to the running wheel, and a control unit, which is adapted to control the drive motor for driving the running wheel depending on the driving force manually applied to, i.e. induced into the running wheel in accordance with a support level.

Such wheelchairs provide the possibility to a wheelchair driver to manually drive the wheelchair, for instance via respective hand rims at the running wheels. However, they support the manual drive as required, by means of the drive motor or the drive motors. For this purpose, the sensor device determines the respective force manually applied to the hand rim and the control unit controls the drive motor or the drive motors for driving the running wheel depending on the force induced into the hand rim in accordance with a support level.

Drive systems of the before-mentioned kind are therefore adapted to physically relieve the wheelchair driver. As a driving force or driving torque, respectively, on the one hand the manual force manually applied by the wheelchair driver to the running wheel, for example via a hand rim, and the torque resulting therefrom and, in addition thereto, an electric driving force and a corresponding driving torque of the drive motor, respectively, which are generated in that the control unit controls the drive motor correspondingly depending on the manually applied force in accordance with a support level are effective. During this kind of operation, the manual driving force and the torque resulting therefrom as well as the torque of the drive motor act in the same rotational direction. Both torques are added as far as their absolute value is concerned. The same applies in case of a breaking operation.

As a result, the wheelchair driver therefore only supplies a portion of the force necessary for locomotion or for breaking and, therefore, can negotiate even ascending and descending slopes without major efforts. The proportion between the manually induced forces and the torque generated by the electric motor, that is the support level, can be set in accordance with the personal requirements of the wheelchair driver and, as the case may be, can be pre-selected.

The option, to adjust the drive assistance device in accordance with the personal requirements of the wheelchair driver makes it desirable to determine these personal requirements as exact as possible. Accordingly, there is a need for an analyzer system which provides a classification of the physical capabilities of a wheelchair driver and, as the case may be, provides an automatic set up of the drive assistance device with suitable parameters.

SUMMARY OF THE INVENTION

The invention aims to provide an apparatus and a method which allow determination of the physical efficiency and muscular effort data of a wheelchair driver in a particularly advantageous manner and, in a specific embodiment of the invention, to provide a suitable pre-adjustment, that is a default of control parameters for controlling the drive motor, for instance the support level, which is specific for a particular user.

According to one aspect, a drive assistance device for a wheelchair is provided comprising a drive motor, a running wheel, a sensor device which is adapted to determine a driving force manually applied to the running wheel and a control unit which is adapted to control the drive motor for driving the running wheel depending on the driving force manually induced by the user into the running wheel in accordance with a support level. The control unit of the drive assistance device according to the present invention comprises a user force analysis operational mode in which it is adapted to determine data concerning physical efficiency and capacity of the wheelchair driver.

Determining data concerning physical capacity of a wheelchair driver, which is necessary in order to effect a suitable setting of the drive assistance device, is therefore provided by the drive assistance device according to the present invention itself. In order to comply with its object as a drive assistance device, the drive assistance device has a sensor device which is adapted to determine a driving force which is manually applied to, i.e. induced into the running wheel. It further has a control unit which is adapted to control the drive motor for driving the running wheel in accordance with a support level depending on a driving force which is manually induced into the running wheel by the user. According to the present invention, a user force analysis operational mode is therefore added to the control unit which user force analysis operational mode makes it possible to determine data concerning physical efficiency and capacity of the wheelchair driver and, therefore, of the user.

The wheelchair driver can deliver his or her performance exactly where it will later be used upon intended use of the drive assistance device. Accordingly, tests can be conducted without additional effort concerning hardware, which tests are not only in step with actual practice but are actually identical with the practice. Applications and analogies which commonly lead to vagueness concerning test results are therefore avoided. Furthermore, effort concerning material and costs for additional test equipment is avoided.

According to an advantageous embodiment of the invention, the control unit is adapted to detect a measuring value or several measuring data during use by the wheelchair driver which use is effected without support via the drive motor. These values and data particularly include the measuring time, the measuring duration, the absolute value of the manually induced force, the direction in which the manually induced force is effective, the period of time during which the manually induced force is effective, the rotational frequency of the running wheel, the rotational angle of the running wheel and an identity code of the running wheel.

The corresponding method for determination of physical efficiency and muscular effort data of a wheelchair driver according to the present invention includes with respect to the manual propulsion of a wheelchair which is equipped with a drive assistance device according to the present invention that the wheelchair driver sits in a corresponding wheelchair and drives it manually without assistance by the drive motor. During this, one or several of the before mentioned measuring values and measuring data are recorded.

According to an advantageous embodiment of the invention, the control unit further comprises a user maximum force determination operational mode in which it is adapted to control the drive motor such that, as a reaction to a driving force manually induced into the running wheel, a torque is generated in a direction opposite to the direction in which the driving force manually induced into the running wheel is effective.

While in case of known drive assistance devices according to the prior art the torque of the motor usually acts in the same direction as the manually induced torque, in order to support the propulsion or to enforce the breaking force in case of this embodiment of the drive assistance device according to the present invention, the motor torque is applied in a direction opposite to the effective direction of the manual drive in case of the user maximum force determination operational mode. Accordingly, a resistance against the manual driving force is generated. From the magnitude of this resistance, the manually applied force can be determined.

Since the drive assistance device itself generates a corresponding resistance, the necessity to provide external resistance in the form of, for instance, a ramp becomes obsolete. The manual driving force which is applied by a wheelchair driver therefore can be determined by the drive assistance device itself.

In an embodiment of the invention, the torque opposite to the effective direction of the driving force manually induced into the running wheel is increased step by step. Preferably, it is started with a low counter torque or breaking torque, respectively, acting against the direction in which the wheelchair driver pushes. This simulates a drive uphill with a moderate slope. This breaking torque or counter torque, respectively, is successively increased overtime, namely as long as the test person finally is no longer able to manually rotate the wheel. From that counter torque at which the user still had been able to cause a rotational movement, a maximum force of the user can be determined. This maximum force represents a dimension which serves to determine which kind of slope a wheelchair driver can negotiate.

Such a drive assistance device and a wheelchair which is equipped with such a drive assistance device, the control unit of which includes the user maximum force determination operational mode as explained above, provides the advantage that the maximum force of the wheelchair driver can be determined with the device as such without that for instance ramps having different slopes have to be provided therefore.

In case of such a method, such wheelchair equipped with a drive assistance device according to the present invention is supported or jacked up, respectively, such that the running wheels are freely rotatable. The user or wheelchair driver, respectively, then takes a seat in the wheelchair and can freely rotate the driving wheels wherein the sole counterforce is the driving torque of the drive motor acting against this rotation.

In an embodiment of the invention, measuring data in the user force analysis operational mode and/or in the user maximum force determination operational mode are transmitted to a data processing device, for instance a personal computer, in real time. This synchronous data transmission not only insures that upon completion of the measuring an evaluation is immediately available, but also provides the possibility for a therapist to monitor the measuring results during the running measuring and, as the case may be, intervene or even stop the measuring in case this should be necessary for medical reasons.

In a further advantageous embodiment of the invention, the control unit comprises a default setting determination operational mode in which it is adapted to determine at least one user specific default setting of control parameters for controlling the drive motor, making use of the measuring data determined in the user force analysis operational mode and/or the user maximum force determination operational mode based on pre-programmed functional interrelations.

In this specific embodiment the drive assistance device according to the present invention therefore not only serves to determine the physical efficiency and muscular effort data of the wheelchair driver, but also effects one or more user specific default settings of control parameters for controlling the drive motor, based on determined capacity data and corresponding functional interrelationships, which can be pre-programmed in the control unit, based on this capacity data. This provides that a particularly simple and exactly fitting setting for the wheelchair driver can be obtained.

The control unit further can be adapted to determine one or more control parameters for controlling the drive motor. This includes particularly the support level of the drive motor proportional to the manually induced force, the build up time of the torque of the drive motor and the reduction time of the torque of the drive motor.

From the user specific default settings of control parameters for controlling the drive motor, which can be determined by the control unit and set correspondingly, the wheelchair driver can select a specific default setting according to his or her own criteria. These criteria specifically include the location of use, the duration of use and the current physical condition. As to the location of use, it can for instance be distinguished between operation of a wheelchair indoors on the one hand or outdoors on the other hand. Although the duration of use can be a deciding criterion, since naturally in case of a longer duration of use the wheelchair driver has to be particularly economical with his or her resources. Furthermore, on days when the wheelchair driver feels weaker, he or she can select another default setting which is different as on those days where he or she feels particularly good.

In a manner known as such, the drive assistance device according to the present invention can comprise a hand rim through which the force can be manually induced into the running wheel. The drive motor can be designed as an electric motor and, specifically, as a hub motor. Such a drive motor can be disposed together with a rechargeable battery and the control unit or parts of the control unit in the hub of the running wheel.

BRIEF DESCRIPTION OF THE DRAWINGS

In the following, the invention is further explained by way of example in connection with the preferred embodiments, making reference to the drawings, in which.

DETAILED DESCRIPTION OF THE INVENTION

Figure 1:
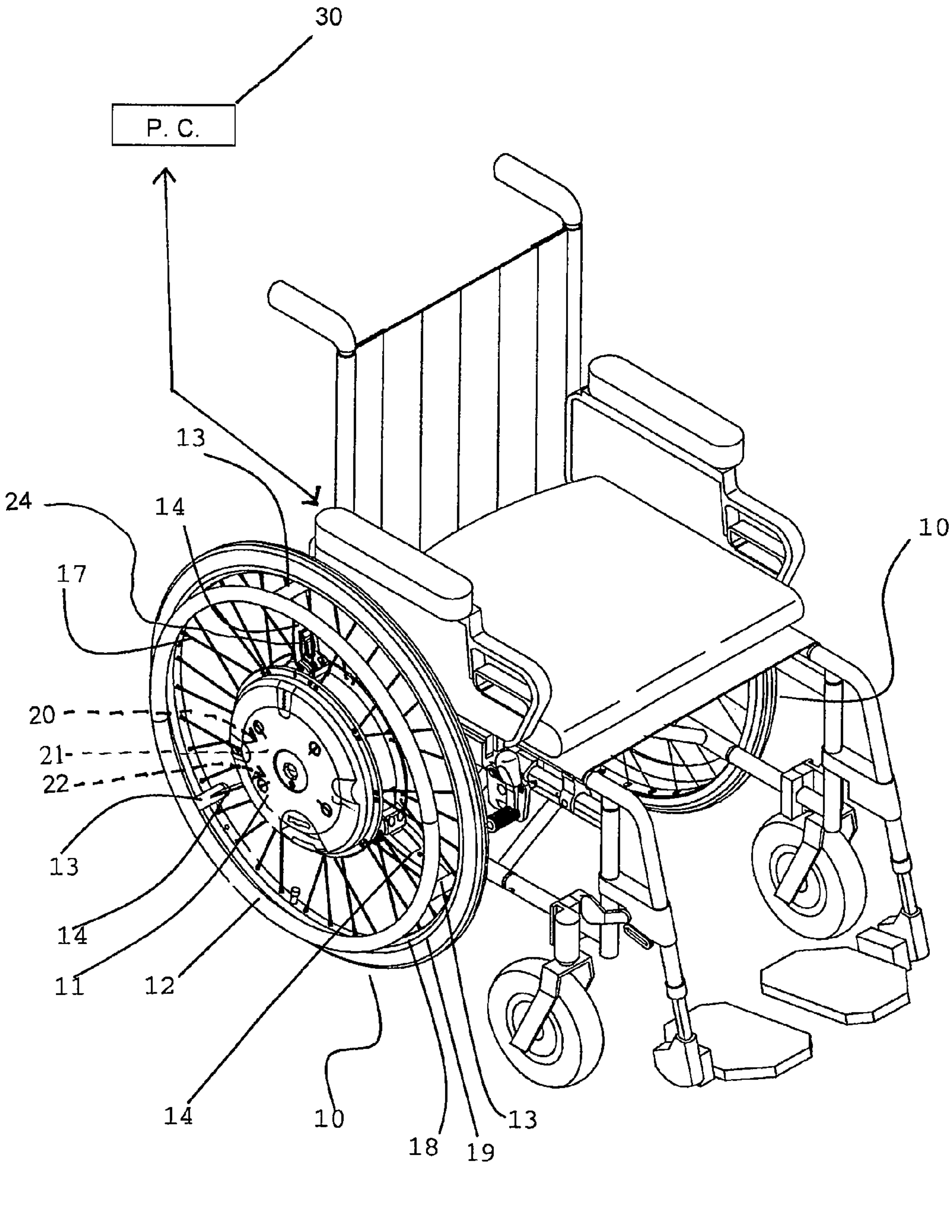
FIG. 1 is an embodiment of a wheelchair according to the present invention having a drive assistance device according to the present invention and FIG. 2 is an exemplary chart of the proportion between the climbing capability indicated in percent and a manual driving force.

FIG. 1 shows a perspective depiction of a wheelchair having two running wheels 10. Each running wheel 10 has a hub 11 which is connected via commercially available spokes 17 with a rim 18 on which a tire 19 is mounted. Inside the hub 11 are located a drive motor which is designed as an electric motor 20, a rechargeable battery 21 and a control unit 22.

A hand rim 12 is connected with the hub 11 via three struts 13 and three spoke elements 14.

In case a manual force is induced into the hand rim 12, this is transmitted directly to the hub 11 via the struts 13 and the spoke elements 14. At least one sensor device 24 which is disposed in at least one of said struts 13 and/or said spoke elements 14 detects the effect of the force which acts on a spoke element 14. This effect is on the one hand a tension generated in the spoke element 14 and on the other hand a deformation of the spoke element 14. At least one, of these effects is sensed, respectively, and serves as a scale for the force induced into the hand rim 12. In accordance with this scale, the drive motor is controlled by the control unit for providing a torque. In this connection, variable or fixed pre-programmed support levels can be provided.

Suitable sensor devices and sensors, respectively, are for instance disclosed in EP 0 945 113 A2, which is incorporated by reference herein in its entirety.

In addition to the common operational mode which increases the manually induced driving force or breaking force, respectively, by means of electric motor 20 in that this electric motor applies a torque in the same direction in which the manually induced force acts, the drive assistance device according to the present invention has additionally a user maximum force determination operational mode in which a torque is generated in a direction opposite to the effective direction of the driving force manually induced into the running wheel 10.

In order to conduct a measurement of the maximum force, the wheelchair shown in FIG. 1 is supported or jacked up, respectively, such that the running wheels 10 are freely rotatable. Then, the control unit 22 of the drive assistance device is set into the user maximum force determination operational mode. A user takes a seat in the wheelchair. When the user now starts to rotate the running wheels 10 by manually inducing force into the hand rim 12, the drive motor generates a counter torque which is first low, due to a control operation of the control unit in the user maximum force determination operational mode. This counter torque is successively increased over time, namely as long as a test person finally is not able any more to rotate the running wheel 10 via the hand rim 12. The determined propulsion force which has just been sufficient to effect a rotational movement is stored as a maximum force.

Depending on the maximum propulsion force, the gradient of a slope which the wheelchair driver can negotiate without drive assistance can be calculated by the following formula:

$$x(F_{max}) := 100 \cdot \tan\left(a\sin\left(\frac{2 \cdot F_{max} \cdot r_{PR}}{d_W \cdot m_{total} \cdot g} - \mu_{WC}\right)\right)$$

Figure 2:
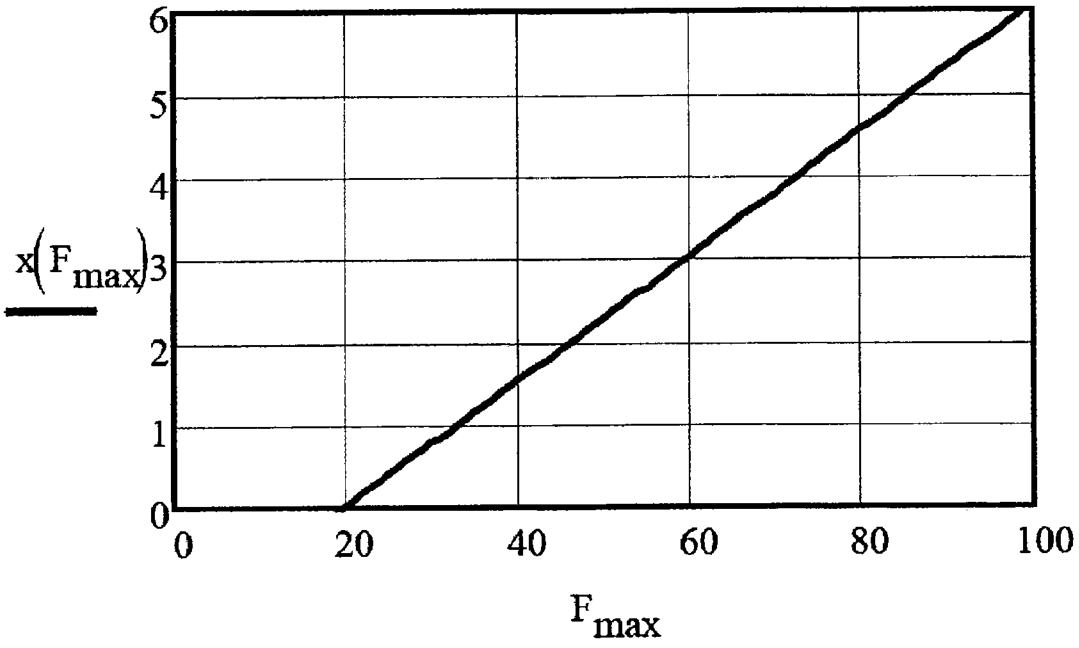

$x(F_{max})$ gradient/% depending on the determined maximum force $F_{max}$ measured maximum force $r_{PR}$ radius of the hand rim $d_w$ diameter of the running wheel $m_{total}$ total mass (wheelchair+driver)

g gravitational acceleration $\mu_{wc}$ rolling friction coefficient of the wheelchair The gradient of the slope which can be negotiated with a certain maximum force depends particularly on the total mass of the wheelchair driver and the wheelchair and the rolling friction coefficient. FIG. 2 shows a corresponding chart for a total mass of 115 kg and a rolling friction coefficient of 0.015.

The control unit 22 further can be operated in a user force analysis operational mode. In case of such an operation of the wheelchair and the corresponding drive assistance device, particularly the kinematics of the driving operation and the propulsion characteristics of the wheelchair driver on a plane are analyzed and the corresponding efficiency (performance) data of the user are determined. The user, that is the wheelchair driver, sits in the wheelchair and propels it manually and without assistance by the drive assistance device. He moves the wheelchair on a horizontal plane as fast as this is physically possible for him, wherein during the test drive data, like for instance the measuring time, the measuring duration, the absolute value of the manually induced force, the effective direction of the manually induced force, the period during which the manually induced force is effective, the rotational frequency of the running wheel 10, the rotational angle of the running wheel 10, and an identity code of the running wheel, are determined and saved. The measuring data can be provided wireless in real time to an external data processing device like for instance a personal computer and/or saved in the control unit itself. The identity code of the running wheel 10 is to be determined specifically for the reason that the measuring data on the left hand side of the user can be separately determined from the measuring data of the right hand side of the user.

The operation as described above is controlled by the control unit 22. The control unit 22 is configured such that it is capable of transmitting measuring data to a data processing device 30, for instance a commercially available standard personal computer, in real time.

The data which have been obtained and transmitted to an external personal computer 30 can be displayed on a screen, just like further data like, for instance, the tangential force at the hand rim and the speed of the wheelchair, for instance in the form of a time chart. By doing this, an analysis can be conducted already in real time.

The determined data provide information to the user and his or her therapist whether it basically makes sense to provide him or her with such a drive assistance device or whether it is actually necessary. The maximum force of the user determined in the user maximum force determination operational mode provides information concerning the maximum slope which the wheelchair driver can negotiate without drive assistance by a motor. This slope can be determined with such slopes which are existent in the personal environment of the wheelchair driver.

Concerning driving on a horizontal plane, the speed which can be reached is an essential parameter. Studies have shown that for a wheelchair driver it is required to obtain a minimum speed of 3.8 km/h in order to speedy cross streets without major risk. Also as to this aspect, a value which is relevant for the practice can be determined by determination of the physical efficiency data of the user in the user force analysis operational mode.

From measuring the rotational angle of the running wheel in connection with other measuring data, the relationship between the propulsion angle and the rolling angle of the wheel can be determined. The therapist can derive therefrom whether the wheelchair driver moves efficiently or whether there is rather a danger of physical problems to be expected. Studies have shown that the propulsion angle should be within a specific range in order to ensure speedy move. If the wheelchair driver is not able to provide such long and constant propulsion impulses, this can be taken in account of by a residual force supporting system of the present kind such that a supporting sustain is provided in phases where the hands are repositioned on the hand rim.

Based on the maximum force of the user determined in the user maximum force determination operational mode, an optimum setting for the support level for negotiating a slope to be driven on can be determined. Based on the physical efficiency data of the user determined in the user force analysis operational mode, it can be ensured by a suitable support level that the wheelchair driver safely reaches a speed of at least 3.8 km/h. If the relation between the propulsion angle and the rolling angle are unfavorable, the phase in which the hands are repositioned on the hand rim is supported in an optimal way by a respective high setting of the support sustain so that a steady drive can be obtained.

These and further suitable characteristic data and functional parameters can be entered by the user or his or her therapist or can be determined and mapped automatically by a data processing program stored in external personal computer 30 or in control unit 22. Based thereon, one or more driving positions can be programmed which can be selected by the wheelchair driver, for instance via a remote control. Depending on the terrain to be driven on or his or her physical condition, which can be different from day to day, the wheelchair driver for instance can select from two different driving positions. Since the respective operational data are stored in the control unit and, as explained above, individually set to the wheelchair driver, the wheelchair driver can operate his or her wheelchair with ideal support values programmed for him or her assisted by the motor.

The setting parameters which can be programmed and used separately for each driving position and each wheel include for instance the support level of the drive motor in proportion to the manually induced force, the build up time of the torque of the drive motor and the reduction time of the torque of the drive motor.

The parameter data can for instance be transmitted via a wireless interface between the control unit and an external data processing apparatus.

Thus, the wheelchair driver is provided with a wheelchair which is adjusted to his specific needs in an optimum way so that he can move the wheelchair safely and without overstraining. Such setting does not require external measuring apparatus and no specific test course, for instance ramps with corresponding slopes, and can be determined in real time on the wheelchair which actually will be used by the wheelchair driver.

While preferred embodiments of the invention have been shown and described herein, it will be understood that such embodiments are provided by way of example only. Numerous variations, changes and substitutions will occur to those skilled in the art without departing from the spirit of the invention. Accordingly, it is intended that the appended claims cover all such variations as fall within the spirit and scope of the invention.

The invention claimed is:

1. A drive assistance device for a wheelchair, comprising:
- a running wheel;
- a drive motor providing assistance by driving the running wheel;
- a sensor device which determines a driving force manually applied by a user to the running wheel; and
- a control unit which controls the drive motor for driving the running wheel depending on the driving force manually applied by the user to the running wheel;
- wherein the control unit comprises a user force analysis operational mode which determines data relating to physical efficiency and capacity of the user during use of the wheelchair.

2. The drive assistance device according to claim 1, wherein the control unit comprises a user maximum force determination operational mode which is adapted to control the drive motor such that, as a reaction to the driving force manually induced into the running wheel, a torque is generated in a direction opposite to a direction in which the driving force manually induced into the running wheel is effective.

3. The drive assistance device according to claim 2, wherein the control unit is adapted to control the drive motor in the user maximum force determination operational mode such that the torque opposite to the effective direction of the driving force manually induced into the running wheel is increased step by step.

4. The drive assistance device according to claim 3, wherein the control unit is adapted to control the drive motor in the user maximum force determination operational mode such that the increasing of the torque step by step in a direction opposite to a direction in which the driving force manually induced into the running wheel is effected is stopped when the user is no longer able to manually turn the running wheel against the torque.

5. The drive assistance device according to claim 4, wherein the control unit is adapted to store a value of a maximum torque and determine a maximum force of the user therefrom.

6. The drive assistance device according to claim 2, wherein the control unit comprises a default setting determination operational mode which is adapted to determine at least one user specific default setting of control parameters for controlling the drive motor, making use of the measuring data determined in at least one of the user force analysis operational mode and the user maximum force determination operational mode.

7. The drive assistance device according to claim 6, wherein the control unit is adapted to determine one or more control parameters for controlling the drive motor selected from the group consisting of:
- assistance from the drive motor proportional to the manually induced driving force, a build up time of the torque of the drive motor, and a reduction time of the torque of the drive motor.

8. The drive assistance device according to claim 7, wherein the control unit is adapted to determine a plurality of user specific default settings of control parameters for controlling the drive motor, which default settings can be selected by the user, based on one or more criteria selected from the group consisting of:
- a location of use, a duration of use, and a current physical condition of the user.

9. The drive assistance device according to claim 6, wherein the control unit is adapted to determine a plurality of user specific default settings of control parameters for controlling the drive motor, which default settings can be selected by the user, based on one or more criteria selected from the group consisting of:
- a location of use, a duration of use, and a current physical condition of the user.

10. The drive assistance device according to claim 2, wherein the control unit is adapted to transfer measuring data in real time to an external data processing device in at least one of the user force analysis operational mode and the user maximum force determination operational mode.

11. A wheelchair having the drive assistance device according to claim 1.

12. A method for determination of physical efficiency and muscular effort data of the user with respect to manual propulsion of the wheelchair according to claim 11 wherein
- during use of the wheelchair by the user which use is effected without assistance from the drive motor, one or several of measuring values and measuring data are recorded by said control unit selected from the group consisting of:
- measuring time, measuring duration, an absolute value of the manually induced driving force, a direction in which the manually induced driving force is effective, a period of time during which the manually induced driving force is effective, a rotational frequency of the running wheel, a rotational angle of the running wheel, and an identity code of the running wheel.

13. The method according to claim 12, wherein the control unit determines at least one user specific default setting of control parameters for controlling the drive motor, based on at least one of the determined measuring data and the maximum driving force of the user, based on pre-programmed functional interrelations.

14. The method according to claim 13, wherein the control parameters for controlling the drive motor include one or more control parameters selected from the group consisting of:

assistance from the drive motor proportional to the manually induced driving force, a build up time of the torque of the drive motor, and a reduction time of the torque of the drive motor.

15. The method according to claim 13, wherein the control unit determines a plurality of user specific default settings of control parameters for controlling the drive motor, which default settings can be selected by the user, based on one or more criteria selected from the group consisting of:

a location of use, a duration of use, and a current physical condition of the user.

16. The method according to claim 12, wherein the wheelchair is supported such that its running wheels are freely rotatable, the control unit generates a torque in response to a driving force manually induced into the running wheel and in a direction opposite to the direction in which the manually induced driving force is effective, the torque opposite to the direction in which the driving force which is manually induced into the running wheel is effective is increased step by step until the user can no longer manually rotate the running wheel against said torque, and the control unit stores a maximum value of the torque and determines therefrom a maximum driving force of the user.

17. The method according to claim 12, wherein the control unit transmits at least one of the measuring data and control parameters in real time to an external data processing apparatus.

18. The wheelchair according to claim 11, wherein viewed in a driving direction of the wheelchair, on each side of the wheelchair there is provided a drive assistance device, wherein the drive assistance devices can be operated independently from each other so that one or more of the group consisting of physical capacity data and a maximum force of the user can be determined separately for each side and, based thereon, at least one user specific default setting of control parameters for controlling both drive motors can be determined.

19. The drive assistance device according to claim 1, wherein the control unit is adapted to detect a measuring value or several measuring data during use by the user which use is effected without assistance from the drive motor, wherein the measuring value and data include one or more of the group including:

measuring time, measuring duration, an absolute value of the manually induced driving force, a direction in which the manually induced driving force is effective, a period of time during which the manually induced driving force is effective, rotational frequency of the running wheel, rotational angle of the running wheel, an identity code of the running wheel.

20. The drive assistance device according to claim 19, wherein the control unit comprises a user maximum force determination operational mode which is adapted to control the drive motor such that, as a reaction to the driving force manually induced into the running wheel, a torque is generated in a direction opposite to the direction in which the driving force manually induced into the running wheel is effective.

21. The drive assistance device according to claim 1, further comprising a hand rim through which the driving force can be manually induced into the running wheel.

22. The drive assistance device according to claim 1, wherein the drive motor is an electric motor, and the drive motor, together with a rechargeable battery and at least a portion of the control unit is disposed in a hub of the running wheel.

* * * * *